United States Patent
Bossini (10) Patent No.: US 12,226,720 B2
(45) Date of Patent: Feb. 18, 2025

(54) FILTER FOR TREATING A FLUID IN A PIPING OF A HEATING AND/OR COOLING SYSTEM, IN PARTICULAR OF DOMESTIC AND/OR INDUSTRIAL TYPE

(71) Applicant: RBM IBOX S.R.L., Nave (IT)

(72) Inventor: Guido Bossini, Brescia (IT)

(73) Assignee: R.B.M. S.P.A., Loc. S. Giovanni (IT)

( * ) Notice: Subject to any disclaimer, the term of this patent is extended or adjusted under 35 U.S.C. 154(b) by 613 days.

(21) Appl. No.: 17/611,331

(22) PCT Filed: May 15, 2020

(86) PCT No.: PCT/IB2020/054622
§ 371 (c)(1),
(2) Date: Nov. 15, 2021

(87) PCT Pub. No.: WO2020/234721
PCT Pub. Date: Nov. 26, 2020

(65) Prior Publication Data
US 2022/0226758 A1    Jul. 21, 2022

(30) Foreign Application Priority Data

May 17, 2019  (IT) .................. 102019000006977

(51) Int. Cl.
*B01D 29/11* (2006.01)
*B01D 35/02* (2006.01)
(Continued)

(52) U.S. Cl.
CPC ............ *B01D 35/02* (2013.01); *B01D 29/114* (2013.01); *B01D 35/06* (2013.01); *B01D 35/153* (2013.01);
(Continued)

(58) Field of Classification Search
CPC ...... B01D 35/02; B01D 29/114; B01D 35/06; B01D 35/153; B01D 35/157;
(Continued)

(56) References Cited

U.S. PATENT DOCUMENTS 3,289,841 A * 12/1966 Quinting ................ B01D 35/15
55/420
2012/0031821 A1 * 2/2012 Swain .................... B01D 35/30
210/232

(Continued)

FOREIGN PATENT DOCUMENTS

DE       22 16 149 A1    10/1972
EP       3159313 A1 *   4/2017 ............ B01D 29/23
(Continued)

OTHER PUBLICATIONS

English Translation of Patent Publication WO 2011142476, published Nov. 17, 2011. (Year: 2011).*

(Continued)

*Primary Examiner* — Joseph W Drodge
(74) *Attorney, Agent, or Firm* — Workman Nydegger (57) ABSTRACT

A filter for treating a fluid in a piping of a heating and/or cooling system, in particular of domestic and/or industrial type, includes: a main body internally having at least one chamber, a first mouth and a second mouth respectively comprising a first duct and a second duct allowing the fluid to enter and/or exit the at least one chamber, wherein the first mouth has a first longitudinal axis and the second mouth has a second longitudinal axis, in particular the second mouth being positioned on the main body in such a way that its second longitudinal axis is substantially perpendicular to the first longitudinal axis of the first mouth;
a filtering element for treating the fluid, housed at least partially in the chamber, in particular the filtering element having at least one magnetic element adapted (Continued)

to intercept and trap the ferrous impurities that are present in the fluid to be treated.

15 Claims, 5 Drawing Sheets

(51) Int. Cl.
| | |
|---|---|
| *B01D 35/06* | (2006.01) |
| *B01D 35/15* | (2006.01) |
| *B01D 35/153* | (2006.01) |
| *B03C 1/03* | (2006.01) |
| *B03C 1/033* | (2006.01) |
| *B03C 1/28* | (2006.01) |
| *B03C 1/30* | (2006.01) |
| *F16L 55/24* | (2006.01) |

(52) U.S. Cl.
CPC ............ *B03C 1/0332* (2013.01); *B03C 1/286* (2013.01); *B03C 1/288* (2013.01); *B03C 1/30* (2013.01); *F16L 55/24* (2013.01); *B03C 2201/18* (2013.01); *B03C 2201/28* (2013.01)

(58) Field of Classification Search
CPC .... B01D 35/1573; B01D 36/00; B01D 36/02; B01D 2201/16; B01D 2201/165; B01D 2201/30; B01D 2201/31; B03C 1/0332; B03C 1/286; B03C 1/288; B03C 1/30; B03C 2201/18; B03C 2201/28; F16L 55/24; E03B 7/07; E03C 1/10; E03C 2201/40; F24D 19/0092; C02F 1/001; C02F 1/488; C02F 2103/004; C02F 2103/005; C02F 2103/006; C02F 2103/023; C02F 2201/006; C02F 2307/14

See application file for complete search history.

(56) References Cited

U.S. PATENT DOCUMENTS

| | | | |
|---|---|---|---|
| 2017/0340994 A1* | 11/2017 | Downie | .................... F24H 9/45 |
| 2022/0072453 A1* | 3/2022 | Bossini | .................. C02F 1/001 |

FOREIGN PATENT DOCUMENTS

| | | | | | |
|---|---|---|---|---|---|
| GB | 1 393 181 | A | | 5/1975 | |
| GB | 2500908 | A | * | 10/2013 | ............... B03C 1/00 |
| GB | 2501610 | A | * | 10/2013 | ............. B01D 35/06 |
| GB | 2 565 321 | A | | 2/2019 | |
| WO | 2004/106245 | A1 | | 12/2004 | |
| WO | WO-2011142476 | A1 | * | 11/2011 | .............. C02F 1/441 |
| WO | 2018/207083 | A1 | | 11/2018 | |

OTHER PUBLICATIONS

International Preliminary Report on Patentability dated Nov. 16, 2021, issued in PCT Application No. PCT/IB2020/054622, filed May 15, 2020.
International Search Report dated Sep. 14, 2020, issued in PCT Application No. PCT/IB2020/054622, filed May 15, 2020.
Written Opinion dated Sep. 14, 2020, issued in PCT Application No. PCT/IB2020/054622, filed May 15, 2020.

* cited by examiner

FILTER FOR TREATING A FLUID IN A PIPING OF A HEATING AND/OR COOLING SYSTEM, IN PARTICULAR OF DOMESTIC AND/OR INDUSTRIAL TYPE

BACKGROUND OF THE INVENTION

1. The Field of the Invention

The present invention relates to a filter for treating a fluid in a piping of a heating and/or cooling system, in particular of domestic and/or industrial type, according to the preamble of claim 1.

2. The Relevant Technology

In hydronic heating and/or cooling systems, it has become increasingly common to take all possible actions aimed at keeping the heat-transfer fluid as clean as possible (which is normally water, possibly with the addition of glycol or similar substances) and free from impurities that, especially in old systems, typically have a very high concentration of ferrous particles released from system components, particularly from pipes (typically made of iron) and radiators.

Such impurities are circulated by a pump included in the system; therefore, they tend to impair the proper and efficient operation of the control elements (e.g., valve components) and also of any heat exchangers included in the generators (e.g., boilers, refrigerators, heat pumps, and so on).

If such impurities are not removed, in the long run they can reduce the efficiency of the system and lead to damage to the components thereof, e.g., said control elements, exchangers and generators.

Moreover, such impurities may lead to perforation of the pipes due to corrosion; in fact, the accumulated impurities, in contact with the oxygen that is present in water, tend to oxidize those parts of the system where they deposit and may cause corrosion of such parts, resulting in a perforated pipe.

For these reasons, several techniques and method are known in the art for removing impurities from the fluid flowing in pipes of a water supply system, in particular a heating and/or cooling system.

In particular, it is known to use at least one filter associated with a pipe of the heating and/or cooling system, in particular said filter comprising at least one magnetic element trapping the ferrous impurities that may be present in the system.

Typically, said filter is associated with a pipe of the return circuit of the system for protecting the power generator (whether a heating power generator, e.g., a boiler, or a cooling power generator).

It is clear that the filters normally employed for heating and cooling system protection must be periodically maintained, in particular for the purpose of removing the residues of impurities that have accumulated after the heat-transfer fluid has flowed therethrough many times.

In this regard, it has been observed that the filters known in the art have some drawbacks, since in some cases such maintenance work is quite demanding because it requires that the heating and cooling system be completely drained of the liquid circulating therein.

In other cases, maintenance can be carried out by providing a first shut-off valve associated with the system and positioned upstream of the filter (so that it is possible to stop the flow of fluid towards the filter) and also a second shut-off valve associated with the system and positioned downstream of the filter, i.e., between the filter and the power generator (so that it is possible to stop the flow of fluid exiting the filter), the provision of said first and second shut-off valves making it possible to substantially isolate the filter from the rest of the system prior to removing the residues of impurities that have accumulated therein.

Nevertheless, also this solution has some drawbacks, in that associating the filter and the shut-off valves with the system is very difficult, and sometimes even impossible, because of the limited space normally left available in modern heating and cooling systems; it must be pointed out that this problem is particularly felt in apartments and houses where the power generator (boiler) is placed in suitable wall units that normally do not leave sufficient room for positioning a filter and the associated shut-off valves.

A further drawback is that the filters known in the art are not versatile and do not allow an installer to easily and readily use the same filter in association with different types of power generators and different installation configurations.

Document WO2018/207083A1 relates to a sludge separator for heating systems, which comprises a valve device (i.e., a fluid shut-off valve) combined with a filter device, which are structurally and functionally integrated together.

In particular, the sludge separator shown in document WO2018/207083A1 comprises a filter device having a cup-shaped body removably connected to a valve body having an inlet and an outlet for a heat-transfer fluid, an obstructor being provided in said valve body, fixed to a rod that can be manually actuated in order to close the inlet by means of said obstructor.

However, the sludge separator shown in document WO2018/207083A1 essentially still suffers from the same drawbacks as the devices known in the art. In fact, the mutual integration of a valve device and a filter device does not result in a device suitable for being optimally installed in the limited space available in modern heating and cooling systems. Moreover, said sludge separator does not allow an installer to easily and readily use the separator in association with different types of power generators and different installation configurations.

SUMMARY OF THE INVENTION

In this frame, it is the main object of the present invention to provide a filter for treating a fluid in a piping of a heating and/or cooling system, in particular of domestic and/or industrial type, which is so realized as to overcome the drawbacks of the prior art.

In particular, it is one object of the present invention to provide a filter for treating a fluid in a piping of a heating and/or cooling system, in particular of domestic and/or industrial type, which is so constructed that it can be easily subjected to maintenance work for removing the residues of impurities that have accumulated therein after the heat-transfer fluid has flowed therethrough many times.

It is another object of the present invention to provide a filter for treating a fluid in a piping of a heating and/or cooling system, in particular of domestic and/or industrial type, which is so constructed that it can be optimally installed in the limited space left available in modern heating and cooling systems.

It is a further object of the present invention to provide a filter for treating a fluid in a piping of a heating and/or cooling system, in particular of domestic and/or industrial type, which is so constructed as to be versatile and allow an installer to easily and readily use the filter in association with different types of power generators and different installation configurations.

Said objects are achieved by the present invention through a filter for treating a fluid in a piping of a heating and/or cooling system, in particular of domestic and/or industrial type, incorporating the features set out in the appended claims, which are an integral part of the present description.

BRIEF DESCRIPTION OF THE DRAWINGS

Further objects, features and advantages of the present invention will become apparent from the following detailed description and from the annexed drawings, which are supplied by way of non-limiting explanatory example, wherein.

DETAILED DESCRIPTION OF THE PREFERRED EMBODIMENTS

In the annexed drawings, reference numeral 1 designates as a whole a filter for treating a fluid in a piping of a heating and/or cooling system, in particular of domestic and/or industrial type, according to the present invention.

The filter 1 comprises a main body 2 internally comprising at least one chamber 10.

The filter 1 then has a first mouth 11 and a second mouth 12, respectively comprising a first duct C1 and a second duct C2 allowing the fluid to enter and/or exit said at least one chamber 10. In particular, the first duct C1 and the second duct C2 are adapted to put said at least one chamber 10 of the filter 1 in communication with the other components (not shown in the annexed drawings) of the heating and/or cooling system, in particular with the pipes thereof.

The first mouth 11 has a first longitudinal axis X and the second mouth 12 has a second longitudinal axis Y, in particular the second mouth 12 being preferably positioned on the main body 2 in such a way that the second longitudinal axis Y is substantially perpendicular to the first longitudinal axis X of the first mouth 11.

In a preferred embodiment, the main body 2 has a substantially cylindrical shape; in such an embodiment, the first mouth 11 is located on the side surface of the main body 2, whereas the second mouth 12 is located at one end (or base) of the substantially cylindrical main body 2. In this preferred embodiment, the second longitudinal axis Y of the second mouth 12 is substantially parallel to a longitudinal axis of the filter 1; it should be noted that in the annexed FIGS. 2b and 3b said longitudinal axis of the filter 1 and the second longitudinal axis Y of the second mouth 12 coincide, and are therefore represented as a single straight line Y-Y.

Preferably, the first mouth 11 and the second mouth 12 are positioned on the main body 2 in such a way as to lie substantially in the same longitudinal plane, said longitudinal plane being parallel to a longitudinal axis of the filter 1; as previously explained, said longitudinal axis of the filter 1 is not shown in the annexed drawings because it substantially coincides with the second longitudinal axis Y of the second mouth 12 or is substantially parallel to said second longitudinal axis Y.

The filter 1 comprises also a filtering element 20 for treating the fluid, housed at least partially in said at least one chamber 10, in particular said filtering element 20 comprising at least one magnetic element 21 adapted to intercept and trap the ferrous impurities that are present in the fluid to be treated.

Figure 2A:
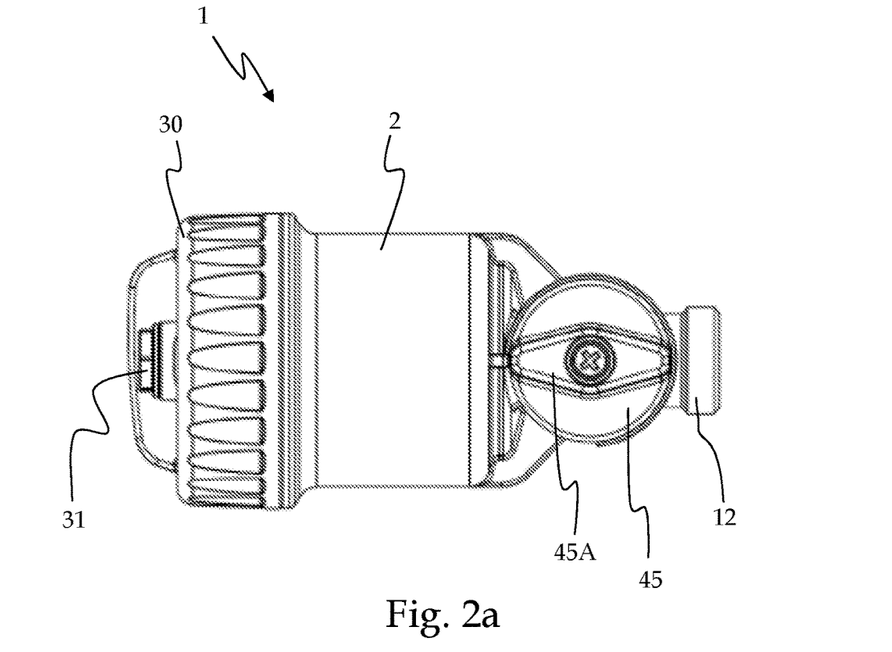
FIGS. 2a and 2b are a side view and a longitudinal sectional side view, respectively, of the filter according to the present invention in a first operating condition.
Figure 2B:
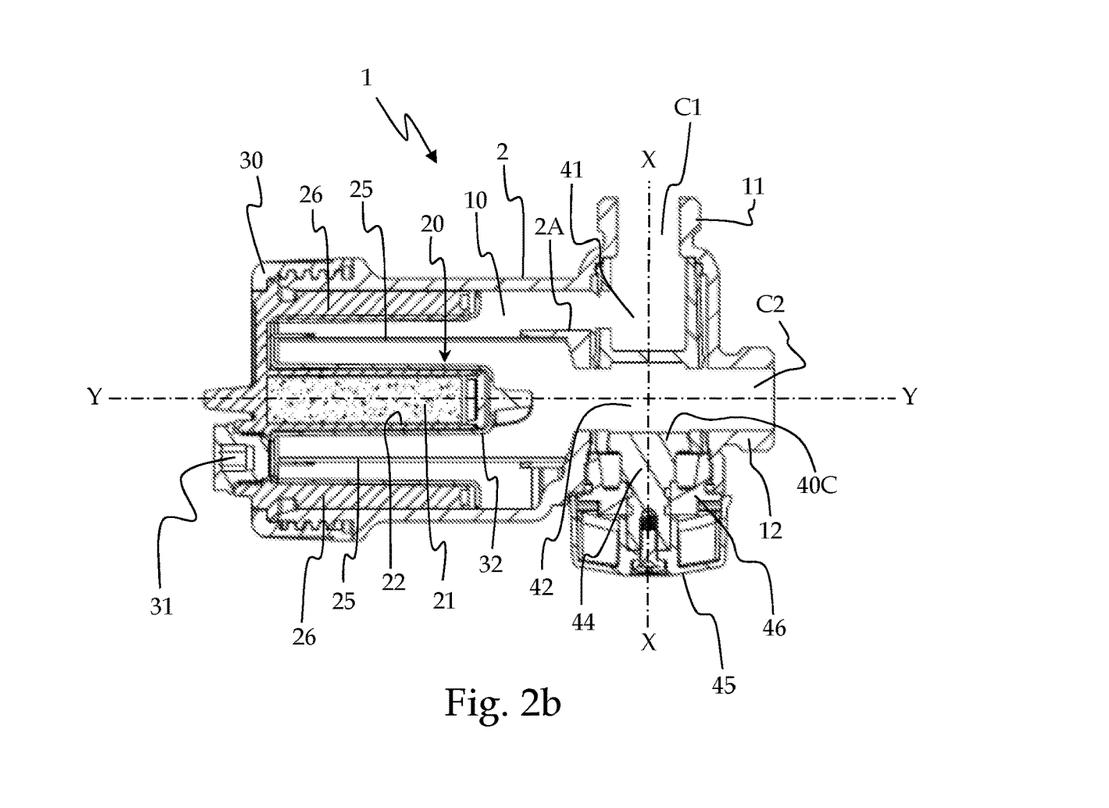
Figure 3A:
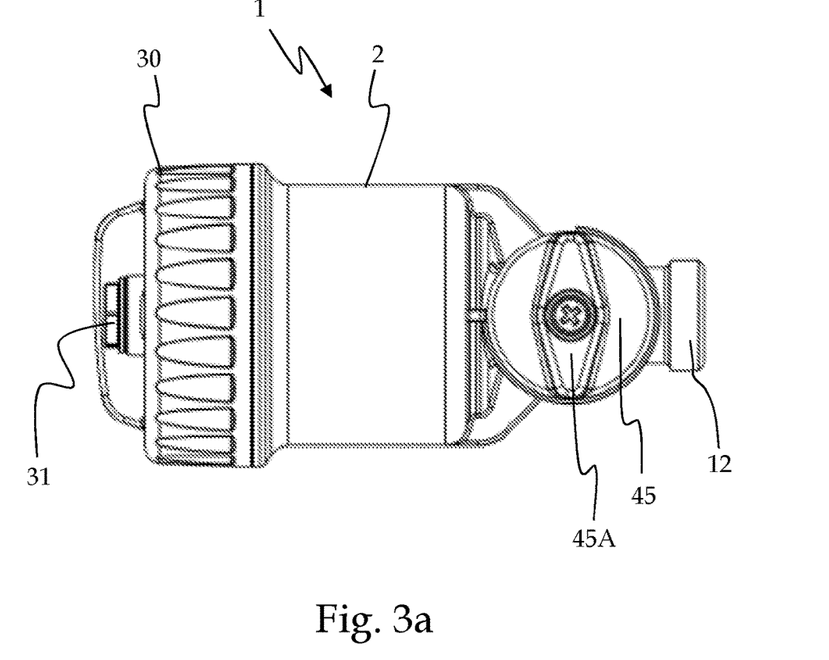
FIGS. 3a and 3b are a side view and a longitudinal sectional side view, respectively, of the filter according to the present invention in a second operating condition.
Figure 3B:
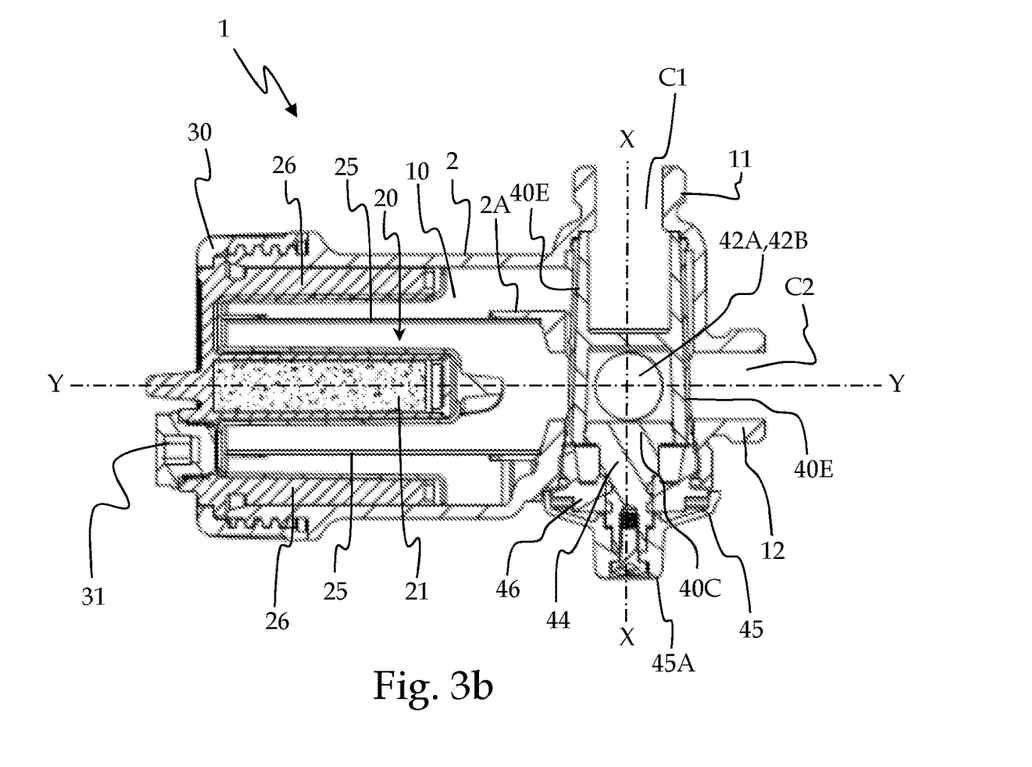

In a preferred embodiment, and as shown in the annexed FIGS. 2b and 3b, said at least one magnetic element 21 has a substantially rod-like shape.

The filter 1 comprises a closing element or plug 30 adapted to be coupled to the main body 2 in order to close said at least one chamber 10.

In accordance with the present invention, the filter 1 comprises a shut-off element 40 housed in a portion of said at least one chamber 10 communicating with said first duct C1 and second duct C2.

Figure 4:
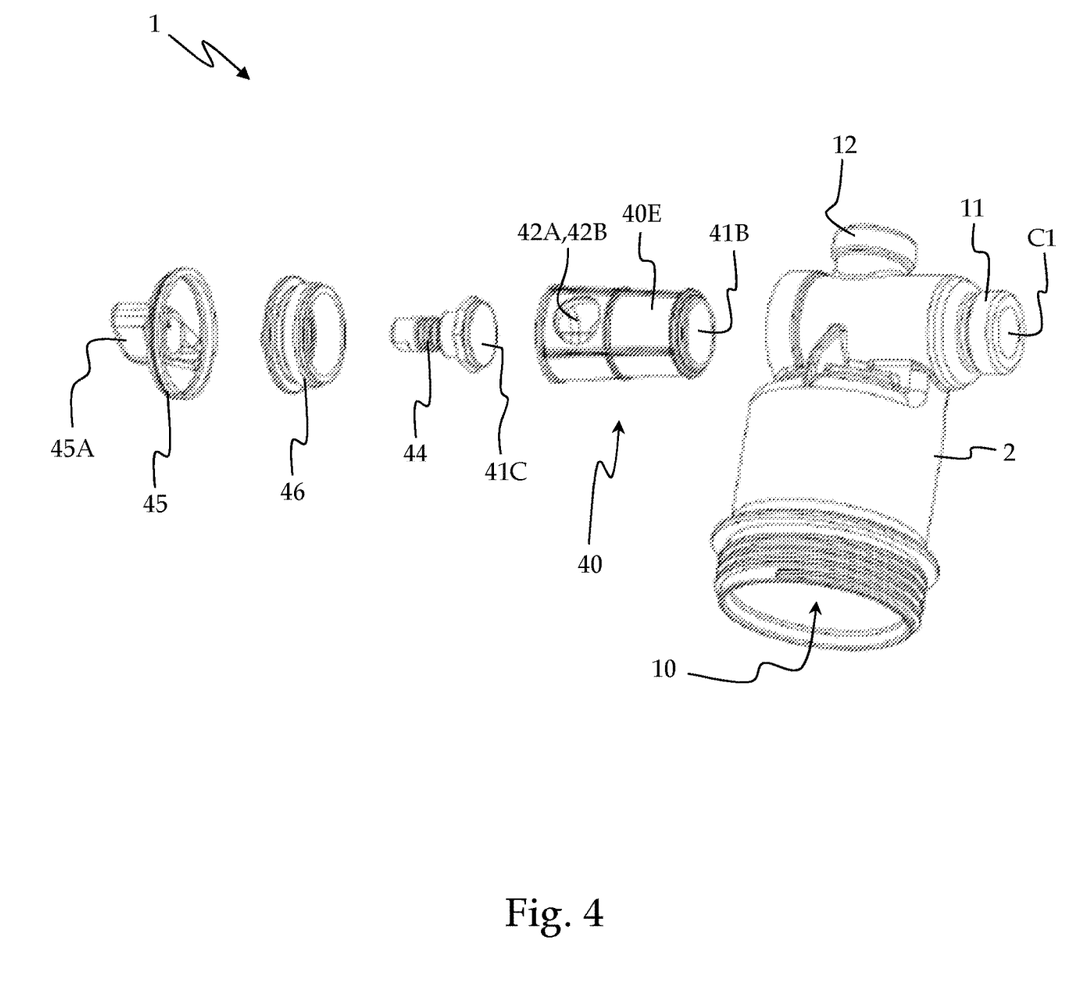
FIG. 4 is an exploded view of some components of the filter according to the present invention.
Figure 5A:
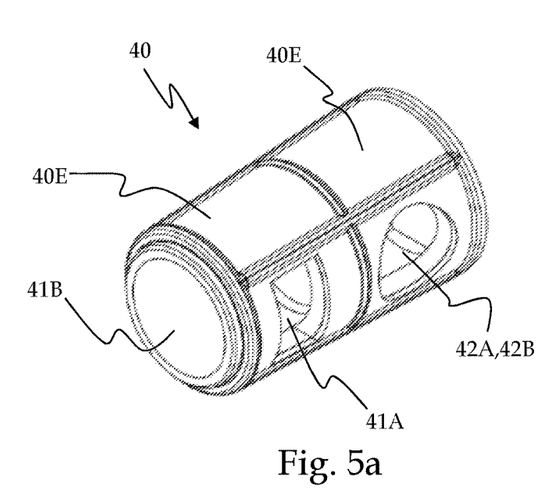
FIG. 5a is a perspective view of a component of the filter according to the present invention.
Figure 5B:
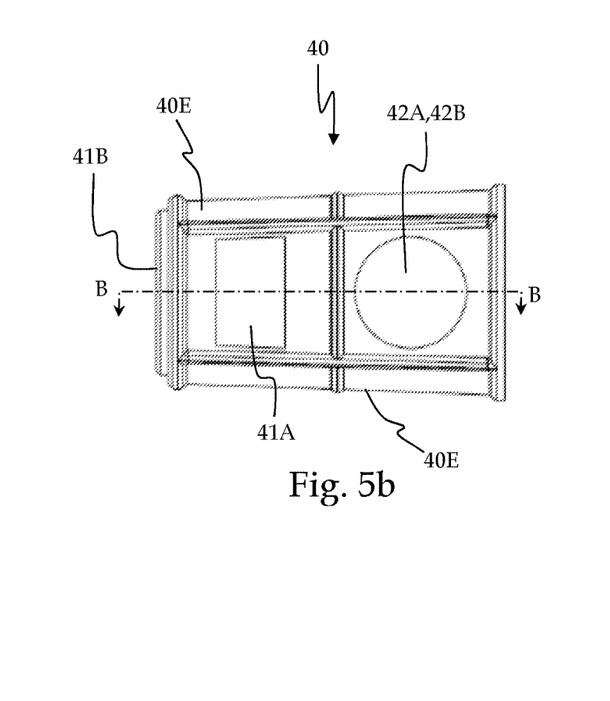
FIG. 5b is a side view of the component of FIG. 5a, and FIG. 5c is a sectional view along line B-B of FIG. 5b.
Figure 5C:
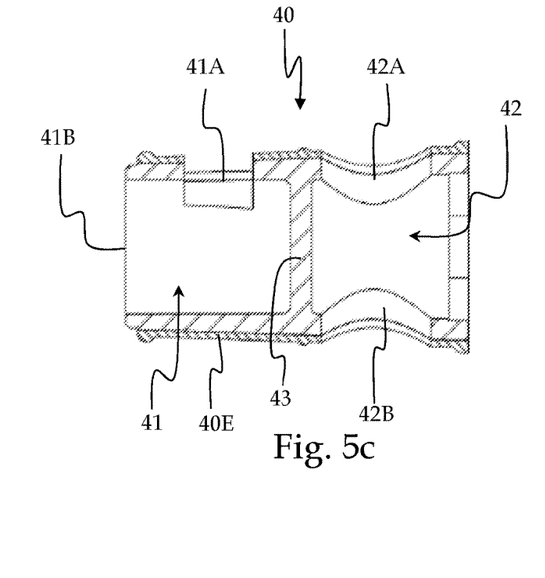

As particularly visible in FIGS. 4 to 5c, said shut-off element 40 has a substantially cylindrical or truncated conical shape and is provided with an outer wall 40E, a first channel 41, a second channel 42, and a septum 43 adapted to divide said first and second channels 41, 42 from each other, said shut-off element 40 being adapted to rotate about a longitudinal axis of its own, which is substantially parallel to or coincides with the first longitudinal axis X of the first mouth 11, so that it can be reversibly switched:

from a first position (which may also be defined as "open" position, such position being shown, in particular, in FIGS. 2a and 2b), in which said shut-off element 40 is positioned in such a way as to allow the flow of fluid to enter the chamber 10 and/or exit the chamber 10 both via the communication of the first duct C1 with said at least one chamber 10 through the first channel 41 and via the communication (which may also be defined as an at least partial alignment) of the second duct C2 with said at least one chamber 10 through the second channel 42, to a second position (which may also be defined as "closed" position, such position being shown, in particular, in FIGS. 3a and 3b), in which said shut-off element 40 is positioned in such a way as to prevent the flow of fluid from entering the chamber 10 and/or exiting the chamber 10, said outer wall 40E obstructing both the communication of the first duct C1 with said at least one chamber 10 through the first channel 41 and the communication of the second duct C2 with said at least one chamber 10 through the second channel 42.

It must be pointed out that the term "reversibly" as used above refers to the fact that the shut-off element 40 can be rotated within the portion of said at least one chamber 10 that communicates with said first duct C1 and said second duct C2 for switching either from the first "open" position to the second "closed" position (as described) or from the second "closed" position to the first "open" position.

In a preferred embodiment, shown in particular in FIGS. 5a to 5c, said substantially cylindrical or truncated conical shut-off element 40 comprises:

a window 41A formed on the outer wall 40E;

an opening 41B at one end of the cylindrical shut-off element 40, wherein the window 41A, the opening 41B, the septum 43 and a part of the inner portion of the cylindrical shut-off element 40 form the first channel 41.

In substance, in the embodiment of the first channel 41 shown in the annexed drawings, the fluid must follow a substantially L-shaped path, since it flows from the chamber 10 to the inner portion of the shut-off device through the window 41A (or, vice versa, it flows from within the shut-off device 40 to the chamber 10 through the window 41A) by following a direction that is substantially parallel to the second axis Y of the second mouth 12, and then flows in the shut-off element 40 along a direction that is substantially parallel to the first axis X of the first mouth 11.

Furthermore, in said preferred embodiment the substantially cylindrical or truncated conical shut-off element 40 comprises a first hole 42A and a second hole 42B formed on the outer wall 40E in a manner such that they are substantially aligned with each other and form the second channel 42, in particular in co-operation with the septum 43 and with a part of the inner portion of the shut-off element 40.

In substance, in the embodiment of the second channel 42 shown in the annexed drawings, the fluid flow must follow a substantially straight path; in fact, it flows through the first hole 42A, within the shut-off element 40 and through the second hole 42B along a direction substantially parallel to the second axis Y of the second mouth 12.

As a consequence, in the second "closed" position the shut-off element 40 is so positioned that the first channel 41 is oriented in such a way as to not put the first duct C1 in communication with said at least one chamber 10, in particular said window 41A being so positioned as to not face, even partially, said at least one chamber 10.

Meanwhile, when the shut-off element 40 is in the second "closed" position, the second channel 42 is misaligned with the second duct C2, in the sense that the first hole 42A and the second hole 42B of said second channel 42 do not face, even partially, the first duct C1. In particular, in said second "closed" position the outer wall 40E of the shut-off element 40 directly obstructs and closes the second duct C2 (as can be seen in FIG. 3b), in particular that part of said second duct C2 which leads into the chamber 10.

It should be noted that the shut-off element 40 is defined herein as an element having a cylindrical or truncated conical shape because it can be constructed, with equivalent results, as either:

- a solid (cylindrical or truncated conical) element, within which the first channel 41 and the second channel 42 are formed, so that the window 41A, the opening 41B, the first hole 42A and the second hole 42B are the end portions of the first channel 41 and of the second channel 42; or
- a hollow (cylindrical or truncated conical) element (i.e., a tubular element), wherein the first channel 41 and the second channel 42 are obtained by forming the window 41A, the first hole 42A and the second hole 42B in the outer wall 40E of such tubular element (cylindrical or truncated conical in shape).

In both of such embodiments, the septum 43 is essentially a wall that permits dividing the path of the first channel 41 from that of the second channel 42, in particular said septum 43 developing within the shut-off element 40 in a way mostly perpendicular to the longitudinal axis of said shut-off element 40, i.e., substantially parallel to the second axis Y of the second mouth 12 when the shut-off element 40 is positioned inside the chamber 10.

It must be pointed out, however, that the first channel 41 and the second channel 42 according to the present invention may also be constructed in different ways and/or shapes, other than those described and shown in the annexed drawings; merely by way of example, the first channel 41 and the second channel 42 may be formed during the moulding of the shut-off element 40 and/or in such a way as to have a more rounded profile than shown in the annexed drawings.

As can be seen in the annexed drawings, the shut-off element 40 has a shape that is substantially complementary to that of the inner portion of the main body 2 that houses it, in particular said shut-off element 40 being so designed as to have slightly smaller dimensions than the inner walls of the main body 2 adapted to receive it, i.e., than the walls of the main body 2 that delimit the chamber 10 and house said shut-off element 40.

In substance, the outer wall 40E of the shut-off element 40 is so realized that its shape substantially matches the shape of the inner wall of the main body 2 to which said outer wall 40E is coupled, in particular said outer wall 40E having a substantially cylindrical or truncated conical shape and a diameter and dimensions slightly smaller than those of the inner wall of the main body 2; such a conformation makes it possible, at the same time, to obtain the rotation of the shut-off element 40 about its longitudinal axis within the chamber 10 of the main body 2, and also to provide an optimal hydraulic sealing between the outer wall 40E and said first duct C1 and second duct C2 when the shut-off element 40 is in said second "closed" position.

Moreover, the shut-off element 40 is shown in the annexed drawings to be positioned in the chamber 10 in such a way that the longitudinal axis of the shut-off element 40 substantially coincides with the first longitudinal axis X of the first mouth 11; as a consequence, the longitudinal axis of the shut-off element 40 is not represented in the annexed drawings. It is however possible to position the shut-off element 40 in the chamber 10 in such a way that its longitudinal axis does not coincide perfectly with the first longitudinal axis X of the first mouth 11 or is offset relative thereto; in fact, for the purposes of the present invention, the shut-off element 40 must be positioned inside the chamber 10 in such a way that it can rotate about an axis of its own while at the same time allowing its the outer wall 40E to obstruct, with optimal hydraulic tightness, the first duct C1 and the second duct C2 when the shut-off element 40 is in said second "closed" position.

The peculiar provisions of the shut-off element 40 according to the present invention make it possible to overcome the drawbacks of the filters known in the art for treating a fluid in a heating/cooling system, in particular of domestic and industrial type.

In fact, such provisions make it possible to provide a filter 1 designed to be easily subjected to maintenance work for removing the residues of impurities that have accumulated therein after the heat-transfer fluid has flowed therethrough many times.

In particular, such maintenance work can be carried out by turning the shut-off element 40 from the first "open" position to the second "closed" position, so as to prevent the flow of fluid from entering the chamber 10 and allow a user/operator to clean the filtering element 20 appropriately. When maintenance is complete, the filter 1 can be brought back into the normal working condition by turning the shut-off element 40 from the second "closed" position to the first "open" position.

It is therefore apparent that the provision of the shut-off element 40 allows the filter 1 of the present invention to be optimally installed in a system without requiring the use of any additional components, such as shut-off valves positioned upstream and downstream of the filter 1; as a result, the filter 1 according to the present invention is particularly suitable also for installation in the limited space available in modern heating and cooling systems.

In the annexed drawings one can see that the chamber 10 of the filter 1 according to the present invention is substantially divided into two portions, i.e., a first portion (communicating with the first duct C1 and the second duct C2) adapted to house the shut-off element 40, and a second portion adapted to house the filtering element 20 for treating the fluid; in this context, the separation of said two portions may be more or less marked depending on the different possible embodiments of the filter 1 of the present invention, as regards both the internal conformation of the chamber 10 and the external conformation of the main body 2 and of the entire filter 1 according to the present invention.

It must be pointed out that the filter 1 may comprise at least one sealing element (not shown) to avoid any fluid leakage between the outer wall 40E of the shut-off element 40 and the main body 2. In a preferred embodiment, said at least one sealing element is made of rubber, and the outer wall 40E is made of polymeric material, said components being mutually associated by co-moulding or another manufacturing technology, or by mechanical coupling between the rubber sealing element and the polymeric outer wall 40E. It is however apparent that the outer wall 40E and the sealing element may also be manufactured otherwise, and the coupling thereof may be effected in a different way (e.g., by mechanical assembly).

In accordance with the present invention, the shut-off element 40 is so constructed as to comprise actuating means 44, 45 (particularly visible in FIGS. 2a to 4) that allow acting upon said shut-off element 40 in order to cause it to rotate about its longitudinal axis and switch from the first position to the second position, and vice versa.

In the embodiment shown in the annexed drawings, said actuating means comprise a pin 44 associated with a closing wall 41C adapted to close an end of the shut-off element 40 opposite to that end of said shut-off element 40 which is provided with the opening 41B. It should be noted that, as shown in FIG. 4, said closing wall 41C is preferably made as one piece with said pin; it is however clear that the closing wall 41C may also be manufactured otherwise, e.g., as one piece with the shut-off element 40 and coupled to the pin 44 by mutual fastening means.

The actuating means may then comprise a knob 45 adapted to be coupled to the pin 44 to facilitate rotating said pin 44 and the shut-off element 40.

Preferably, said knob 45 has a substantially discoid shape and is provided with at least one raised portion 45A that further facilitates the handling of the assembly consisting of the knob 45, the pin 44 and the shut-off element 40.

Furthermore, the raised portion 45A is designed as an elongate protrusion formed on said knob 45 and substantially coinciding with the diameter of said discoid knob 45.

Such a conformation of the raised portion 45A facilitates the correct identification of the position of the shut-off element 40. In fact, when the shut-off element 40 is in the first "open" position (as shown in FIGS. 2a and 2b), the knob 45 is preferably associated with the pin 44 in such a way that the raised portion 45A is aligned with or parallel to the second axis Y of the second mouth 12.

Conversely, when the shut-off element 40 is in the second "closed" position (as shown in FIGS. 3a and 3b), the knob 45 is preferably associated with the pin 44 in such a way that the raised portion 45A is positioned substantially perpendicular to (or anyway incident on) the second axis Y of the second mouth 12.

With particular reference to FIG. 4, it can be further noticed that the filter 1 comprises coupling means adapted to allow fixing the shut-off element 40 in said at least one chamber 10.

In particular, said coupling means may comprise a cover 46 for closing the portion of said at least one chamber 10 that contains the shut-off element 40, said cover 46 preferably having an aperture (not shown in FIG. 4) for the passage of the actuating means 44, 45, in particular for the passage of said pin 44.

As shown in the annexed drawings, the knob 45 and the cover 46 are associated with the main body 2 on the side opposite to the first mouth 11.

In accordance with a preferred embodiment, the first mouth 11 and the second mouth 12 are so constructed as to have substantially the same conformation. In particular, the first mouth 11 and the second mouth 12 are constructed in substantially the same manner in terms of dimensions and shape. In this context, the first mouth 11 and the second mouth 12 comprise similar connection means; for example, said connection means may consist of similar threads on the sides of said first mouth 11 and second mouth 12, the term "sides" referring to that surface of the mouths 11, 12 which is opposite to the one which faces the first duct C1 and the second duct C2, respectively.

The provisions of the present invention concerning the first and second mouths 11, 12 make it possible to considerably improve the potential of the filter 1 according to the present invention, since such provisions allow the filter 1 according to the present invention to be used without distinction in different configurations.

In fact, the filter 1 according to the present invention can be used indifferently in:
a first configuration, wherein the first mouth 11 is associated with a duct for delivering the fluid to a power generator, and wherein the second mouth 12 is associated with a return duct of the heating and/or cooling system;
a second configuration, wherein the first mouth 11 is associated with a return duct of the heating and/or cooling system, and wherein the second mouth 12 is associated with a duct delivering the fluid to a power generator.

Figure 1A:
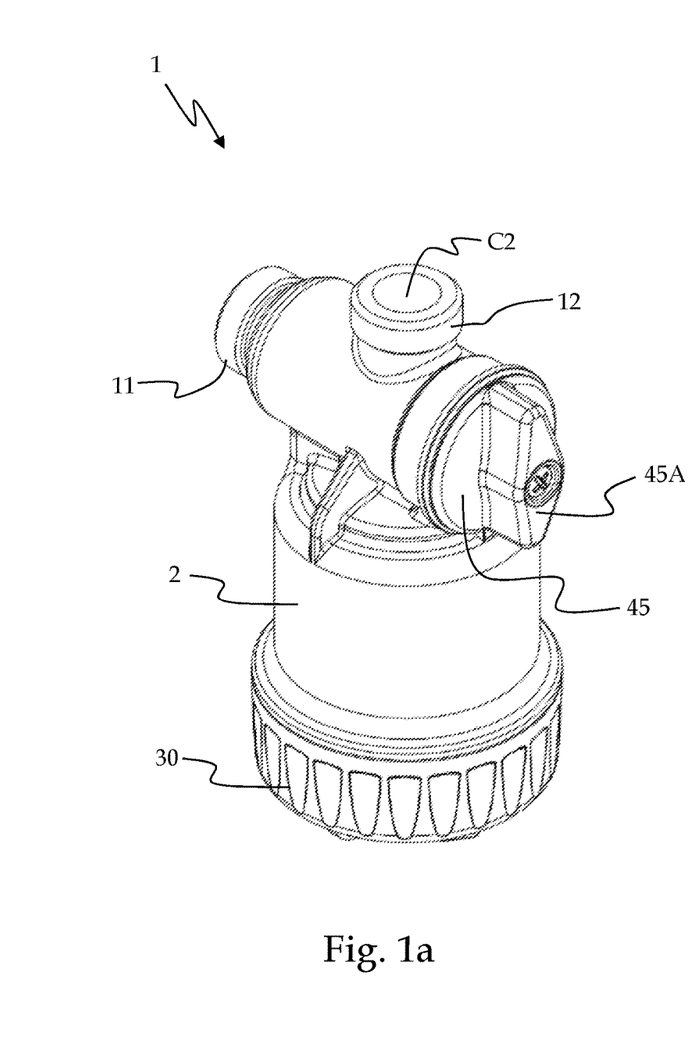
FIGS. 1a and 1b are perspective views of a filter for treating a fluid in a piping of a heating and/or cooling system, in particular of domestic and/or industrial type, according to the present invention.
Figure 1B:
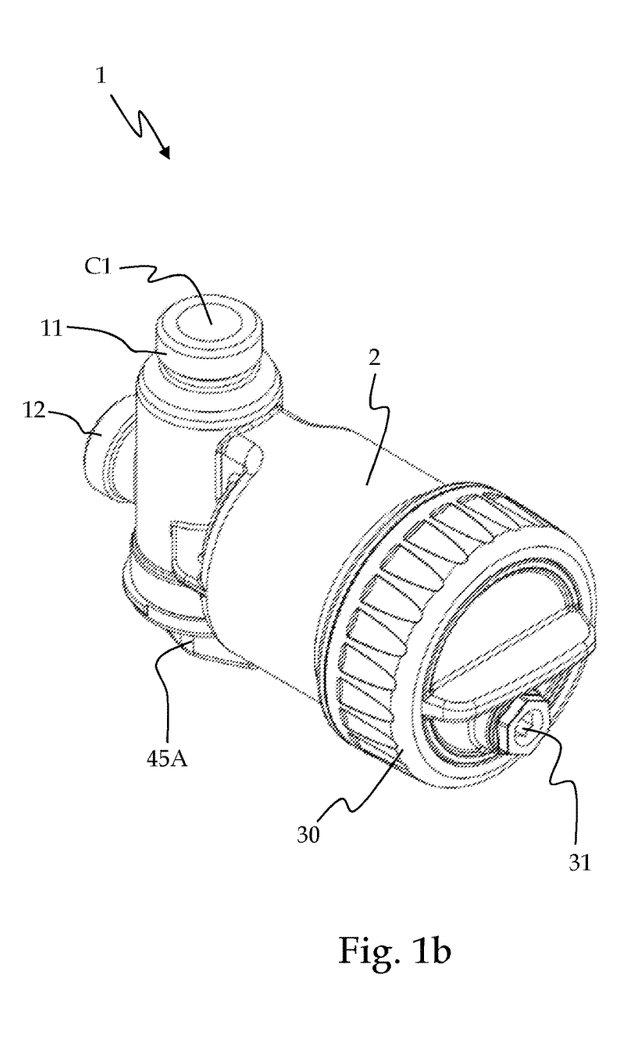

It should be noted that, since the filter 1 according to the present invention is generally installed under a power generator (or boiler), when said filter 1 is used:
in the first configuration, it is mounted in such a way that (as shown in the annexed FIGS. 1b, 2a, 2b, 3a and 3b) the first axis X of the first mouth 11 is substantially vertical and the second axis Y of the second mouth 12 is substantially horizontal;
in the second configuration, it is mounted in such a way that (as shown in the annexed FIG. 1a) the first axis X of the first mouth 11 is substantially horizontal and the second axis Y of the second mouth 12 is substantially vertical.

It must also be pointed out that the annexed drawings do not show the components belonging to the heating and/or cooling system, i.e., the delivery duct, the power generator and the return duct.

In a preferred embodiment, the filter 1 according to the present invention comprises a port 31 (also referred to as "multifunction" port) adapted to put the chamber 10 in communication with the environment outside the filter 1.

For example, said port 31 may be associated with a pressure gauge, for measuring the pressure of the fluid in said chamber 10, or with an air venting device.

Preferably, said "multifunction" port 31 is associated with the closing element or plug 30.

In accordance with the present invention the filtering element 20 is coupled to the closing element 30; in this respect, the filtering element 20 and the closing element 30 comprise mutual coupling means (e.g., respective threads), which allow fixing the filtering element 20 to the closing element 30.

In a preferred embodiment, the closing element 30 comprises a sheath 32 adapted to house the filtering element 20.

In addition, the filtering element 20 preferably comprises a magnet cartridge 22 adapted to house said at least one magnetic element 21, in particular said magnet cartridge 22 being in turn housed inside the sheath 32 of the closing element 30.

As shown in FIGS. 2b, 3b, the magnet cartridge 22 and the sheath 32 develop in such a way as to allow positioning said at least one magnetic element 21 inside the chamber 10 of the filter 1.

Preferably, said at least one magnetic element 21 has a substantially rod-like shape, and the main body 2 of the filter 1 has a substantially cylindrical or cup-like shape, said magnetic element extending within the chamber 10 substantially parallel to the longitudinal axis of the main body 2 of the filter 1 (which substantially coincides with the second axis Y of the second mouth 12); as a consequence, in this embodiment also the magnet cartridge 22 and the sheath 32 extend within the chamber 10 in a direction parallel to the second axis Y of the second mouth 12.

The magnet cartridge 22 is extractable, since it can be separated from said sheath 32 and/or from said at least one magnetic element 21; also, the magnet cartridge 22 and the sheath 32 are preferably made of plastic material. Such provisions facilitate the removal of the ferrous residues captured by said at least one magnetic element 21, which would otherwise be difficult to carry out because of the considerable intensity of the magnetic field generated by said at least one magnetic element 21.

Preferably, the filter 1 according to the present invention comprises a second filtering element 25, in particular of the mesh type, positioned in the chamber 10 for subjecting the fluid to be treated to a mechanical filtering, in particular for the purpose of trapping non-ferromagnetic impurities that may be present in said fluid to be treated; as a consequence, said second filtering element 25 permits subjecting the fluid to an additional filtering action so as to capture any non-ferromagnetic impurities that may have escaped the magnetic field exerted by the magnetic filtering element 20.

In a preferred embodiment, said second filtering element 25 is so constructed as to have a substantially tubular shape and extend parallel to the second axis Y of the second mouth 12.

Preferably, the second filtering element 25 is positioned in the chamber 10 in such a way as to enclose or contain the filtering element 20; moreover, the second filtering element 25 is preferably positioned in the chamber 10 in such a way as to enclose or contain the assembly consisting of the filtering element 20, the magnet cartridge 22 and the sheath 32.

Advantageously, the main body 2 comprises a wall 2A (particularly visible in FIG. 2b), which extends in the chamber 10 parallel to the second axis Y of the second mouth 12, so as to mate with a tract of the second filtering element 25 and allow it to be positioned correctly inside the chamber 10.

In particular, also the wall 2A has a substantially tubular shape, and its cross-section may be slightly greater (as shown in FIG. 2b) than that of the second filtering element 25, so that said wall 2A can be fitted over the initial tract of the second filtering element 25. It is however clear that the wall 15 may alternatively be designed with a cross-section slightly smaller than that of the second filtering element 25, so that it can be inserted into an initial tract of the second filtering element 25.

Furthermore, the closing element 30 may be so shaped as to comprise a recess (not shown in the drawings), in particular having a substantially circular shape when viewed from the front (i.e., in a direction parallel to the axis A-A of the filter 1), which is adapted to receive an end portion of the second filtering element 25 and allow it to be positioned correctly inside the chamber 10, in particular in co-operation with the wall 2A.

Preferably, the filter 1 according to the present invention is provided with a third filtering element 26 comprising at least one additional magnetic element.

In particular, said third filtering element 26 of magnetic type is positioned inside the chamber 10 in a manner such as to be associated with or fixed to the inner wall of the main body 2, i.e., that wall of the main body 2 which faces towards the chamber 10; as an alternative, said third filtering element 26 of magnetic type may be associated with the closing element 30.

The provision of a filter 1 comprising a first filtering element 20 of magnetic type, a second filtering element 25 of mechanical type (mesh) and a third filtering element 26 of magnetic type ensures a complete filtration of the fluid flowing in the chamber 10.

In this regard, it must be pointed out that the filtration of the fluid flow will occur in different ways (while still being optimal) depending on the configuration in which the filter 1 of the present invention is used, with the shut-off element 40 being always positioned in the first "open" position (which allows the flow of fluid to enter the chamber 10 and exit said chamber 10).

In fact, in the situation wherein the filter 1 according to the present invention is used in the configuration referred to herein as "first configuration" (i.e., that configuration—shown in the annexed FIGS. 1b, 2a, 2b, 3a and 3b—in which the first mouth 11 is associated with a duct for delivering the fluid to a power generator, and in which the second mouth 12 is associated with a return duct of the heating and/or cooling system), the fluid enters the chamber 10 through the second duct C2, undergoes a first (magnetic) filtration as it flows in proximity to the first filtering element 20, undergoes a second (mechanical) filtration as it flows through the second mesh-type filtering element 25 (the direction of flow being from the inside to the outside), undergoes a third (magnetic) filtration as it flows in proximity to the third filtering element 26, and then exits the chamber 10 through the first duct C1.

Whereas in the situation wherein the filter 1 according to the present invention is used in the configuration referred to herein as "second configuration" (i.e., that configuration—shown in the annexed FIG. 1a—in which the first mouth 11 is associated with a return duct of the heating and/or cooling system, and wherein the second mouth 12 is associated with a duct for delivering the fluid to a power generator), the fluid enters the chamber 10 through the first duct C1, undergoes a first (magnetic) filtration as it flows in proximity to the third filtering element 26, undergoes a second (mechanical) filtration as it flows through the second mesh-type filtering element 25 (the direction of flow being from the outside to the inside), undergoes a third (magnetic) filtration as it flows in proximity to the filtering element 20, and then exits the chamber 10 through the second duct C2.

It is therefore apparent that, regardless of the mode in which said filter 1 is mounted (whether horizontally, in the "first configuration", or vertically, in the "second configuration"), the flow of fluid will anyway be subjected to three filtering stages, i.e., a first filtering stage of magnetic type, a second filtering stage of mechanical type, and a third filtering stage, again of magnetic type.

In this frame, the provision of three filtering stages (magnetic/mechanical/magnetic) in accordance with the features of the filter 1 of the present invention ensures an optimal filtration of the fluid flow independently of the mode of installation and type of configuration (horizontal or vertical) of said filter 1.

The features of the filter 1 according to the present invention, as well as the advantages thereof, are apparent from the above description.

In fact, the provisions of the present invention make it possible to realize the filter 1 in such a way as to ensure optimal removal of the impurities that are present in a fluid flowing in said water supply network, while at the same time facilitating the maintenance work necessary for removing the residues of impurities that have accumulated after the heat-transfer fluid has flowed therethrough many times. In particular, the filter 1 according to the present invention makes it possible to easily isolate the filter 1 from the heating and/or cooling system; in fact, it will be sufficient to operate the shut-off element 40 in order to isolate the filter 1 from the system and drain only the fluid that is contained in the chamber 10 in order to clean one or more of the filtering elements 20, 25, 26 that are present in said chamber 10. As a consequence, it is apparent that the provisions of the present invention avoid the need for draining the whole system when maintenance in necessary for removing from the filtering elements the residues of impurities that have accumulated in the chamber 10 after the heat-transfer fluid has flowed therethrough many times.

It is therefore apparent that the provision of the shut-off element 40 allows the filter 1 of the present invention to be optimally installed in a system without requiring the use of any additional components, such as shut-off valves positioned upstream and downstream of the filter 1; as a result, the filter 1 according to the present invention is particularly suitable also for installation in the limited space available in modern heating and cooling systems.

Furthermore, the peculiar provisions of the filter 1 according to the present invention make it possible to provide a solution that considerably reduces the complexity and the costs incurred when installing its component in the system, since the filter 1 avoids the need for purchasing and installing any additional components, such as, for example, shut-off valves to be positioned upstream and downstream of the filter 1.

In fact, the provisions of the present invention make it possible to realize said filter 1 in a manner such that it can be optimally installed in the limited space left available in modern heating and cooling systems.

Moreover, the provisions of the present invention make it possible to provide a filter 1 that turns out to be very versatile, in that such provisions will allow an installer to easily and readily use the filter 1 in association with different types of power generators and different installation configurations.

In this frame, it is apparent that the provision of three filtering stages (magnetic/mechanical/magnetic) in accordance with the features of the filter 1 of the present invention ensures an optimal filtration of the fluid flow independently of the mode of installation of said filter 1 (whether horizontal, in the "first configuration", or vertical, in the "second configuration").

The filter 1 for treating a fluid in a piping of a heating and/or cooling system, in particular of domestic and/or industrial type, described herein by way of example may be subject to many possible variations without however departing from the spirit of the inventive idea; it is also clear that in the practical implementation of the invention the illustrated details may have different shapes or be replaced with other technically equivalent elements.

The invention claimed is:

1. A filter for treating a fluid in a piping of a heating and/or cooling system, said filter comprising:
   a main body internally comprising at least one chamber,
   a first mouth and a second mouth respectively comprising a first duct and a second duct allowing a fluid to enter or exit said at least one chamber, wherein said first mouth has a first longitudinal axis and the second mouth has a second longitudinal axis, the second mouth being positioned on the main body in such a way that its second longitudinal axis is substantially perpendicular to the first longitudinal axis of the first mouth;
   a first filtering element for treating the fluid, housed at least partially in said at least one chamber, said first filtering element comprising at least one magnetic element adapted to intercept and trap ferrous impurities that are present in the fluid to be treated; and
   a shut-off element housed in a portion of said at least one chamber communicating with said first duct and said second duct, wherein said shut-off element has a substantially cylindrical or truncated conical shape and is provided with an outer wall, a first channel, a second channel, and a septum adapted to divide the first channel and the second channel from each other, said shut-off element being adapted to rotate about a longitudinal axis of its own, which is substantially parallel to or coincides with the first longitudinal axis of the first mouth, so that the shut-off element can be reversibly switched between:
   a first position, in which said shut-off element is positioned to allow a flow of the fluid to enter said at least one chamber or exit said at least one chamber both via a communication of the first duct with said at least one chamber through the first channel and via a communication of the second duct with said at least one chamber through the second channel, and
   a second position, in which said shut-off element is positioned to prevent the flow of the fluid from entering said at least one chamber or exiting said at least one chamber, said outer wall obstructing both the communication of the first duct with said at least one chamber through the first channel and the communication of the second duct with said at least one chamber through the second channel.

2. The filter according to claim 1, wherein said shut-off element that is substantially cylindrical comprises:
   a window formed on the outer wall;
   an opening at one end of the shut-off element, wherein the window, the opening, the septum, and a part of an inner portion of the shut-off element form the first channel.

3. The filter according to claim 1, wherein said shut-off element that is substantially cylindrical comprises a first hole and a second hole formed on the outer wall in a manner such that they are substantially aligned with each other and form the second channel in co-operation with the septum and with a part of an inner portion of the shut-off element.

4. The filter according to claim 3, wherein in said second position, said shut-off element is so positioned that the first channel is oriented so as to not put the first duct in communication with said at least one chamber, said window being so positioned as to not face, even partially, said at least one chamber, and the second channel is misaligned with the second duct, the first hole and the second hole of said second channel not facing, even partially, the first duct.

5. The filter according to claim 1, wherein the outer wall of the shut-off element is so realized that its shape substantially matches a shape of an inner wall of the main body to which said outer wall is coupled, said outer wall having a substantially cylindrical or truncated conical shape and a diameter and dimensions slightly smaller than those of the inner wall of the main body.

6. The filter according to claim 1, wherein said at least one chamber is divided into two portions, a first portion being adapted to house the shut-off element and a second portion being adapted to house the first filtering element for treating the fluid.

7. The filter according to claim 1, further comprising an actuator that acts upon said shut-off element in order to cause said shut-off element to rotate about its longitudinal axis and switch from the first position to the second position, and vice versa.

8. The filter according to claim 7, wherein said actuator comprises a pin associated with a closing wall adapted to close an end of the shut-off element opposite to an end of the said shut-off element which is provided with an opening.

9. The filter according to claim 8, wherein said closing wall is made as one piece with said pin.

10. The filter according to claim 8, wherein said actuator comprises a knob adapted to be coupled to the pin to facilitate rotating said pin and the shut-off element, said knob having a substantially discoid shape and being provided with at least one raised portion that further facilitates handling of an assembly consisting of the knob, the pin, and the shut-off element.

11. The filter according to claim 7, further comprising coupling means adapted to allow fixing the shut-off element in said at least one chamber, said coupling means comprising a cover for closing the portion of said at least one chamber that contains the shut-off element, and wherein said cover has an aperture for passage of the actuator.

12. The filter according to claim 1, wherein the first mouth and the second mouth are so constructed as to have substantially a same configuration, the first mouth and the second mouth being constructed in substantially a same manner in terms of dimensions and shape.

13. The filter according to claim 1, further comprising a second filtering element positioned in said at least one chamber for subjecting the fluid to be treated to a mechanical filtering, said second filtering element having a substantially tubular shape and extending parallel to the second longitudinal axis of the second mouth, so as to enclose or contain the first filtering element.

14. The filter according to claim 1, further comprising a third filtering element comprising at least one more magnetic element than the first filtering element, said third filtering element of magnetic type being positioned inside said at least one chamber in a manner such as to be associated with or fixed to an inner wall of the main body.

15. The filter according to claim 1, further comprising a closing element or plug adapted to be coupled to the main body in order to close said at least one chamber.

* * * * *